US010472584B2

(12) United States Patent
Emert et al.

(10) Patent No.: US 10,472,584 B2
(45) Date of Patent: *Nov. 12, 2019

(54) DISPERSANT ADDITIVES AND ADDITIVE CONCENTRATES AND LUBRICATING OIL COMPOSITIONS CONTAINING SAME

(71) Applicant: Infineum International Limited, Abingdon (GB)

(72) Inventors: Jacob Emert, Brooklyn, NY (US); Sonia Oberoi, Edison, NJ (US); Gang Hu, Scotch Plains, NJ (US); Peter J. Hobin, Didcot (GB); Gareth B. L. Strange, Oxford (GB); Alessandra Catani, Savona (IT); Claire L. Fitter, Didcot (GB); James R. Millington, Oxford (GB)

(73) Assignee: INFINEUM INTERNATIONAL LTD., Abingdon, Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,257

(22) Filed: Jul. 30, 2015

(65) Prior Publication Data
US 2017/0029738 A1    Feb. 2, 2017

(51) Int. Cl.
| C10M 169/04 | (2006.01) |
| C10M 149/10 | (2006.01) |
| C10M 169/06 | (2006.01) |
| C10M 163/00 | (2006.01) |
| C08G 73/12 | (2006.01) |

(52) U.S. Cl.
CPC ........ *C10M 149/10* (2013.01); *C10M 163/00* (2013.01); *C10M 169/045* (2013.01); *C10M 169/06* (2013.01); *C08G 73/12* (2013.01); *C10M 2207/26* (2013.01); *C10M 2215/28* (2013.01); *C10M 2219/046* (2013.01); *C10M 2223/045* (2013.01); *C10N 2230/02* (2013.01); *C10N 2230/04* (2013.01); *C10N 2270/00* (2013.01)

(58) Field of Classification Search
CPC .............. C10M 129/10; C10M 129/54; C10M 129/91; C10M 129/94; C10M 133/16; C10M 135/10; C10M 141/00; C10M 141/02; C10M 141/06; C10M 141/08; C10M 149/10; C10M 2207/028; C10M 2207/262; C10M 2215/086; C10M 2215/28; C10M 2219/046; C10M 169/045; C10M 163/00; C10M 2223/045; C10M 2207/26; C10M 2217/06; C10M 2219/044; C10M 169/06; C10N 2270/00; C10N 2230/04; C10N 2230/02; C08G 73/12
See application file for complete search history.

(56) References Cited

U.S. PATENT DOCUMENTS

| 3,804,763 | A | 4/1974 | Meinhardt |
| 4,152,499 | A | 5/1979 | Boerzel et al. |
| 4,234,435 | A | 11/1980 | Meinhardt et al. |
| 4,927,551 | A | 5/1990 | Erdman et al. |
| 4,938,881 | A | 7/1990 | Ripple et al. |
| 5,230,714 | A | 7/1993 | Steckel |
| 5,241,003 | A | 8/1993 | Degonia et al. |
| 5,565,128 | A | 10/1996 | Gutierrez |
| 5,756,431 | A | 5/1998 | Emert et al. |
| 5,792,730 | A | 8/1998 | Gutierrez et al. |
| 5,854,186 | A | 12/1998 | Cusumano et al. |
| 6,127,321 | A | 10/2000 | Emert et al. |
| 6,165,235 | A | 12/2000 | Kolp et al. |
| 6,605,571 | B1 * | 8/2003 | Higton ............ F02M 37/14 508/185 |
| 6,734,148 | B2 | 5/2004 | Bell et al. |
| 6,743,757 | B2 | 6/2004 | Bell et al. |
| 7,615,521 | B2 | 11/2009 | Eveland et al. |
| 8,728,995 | B2 | 5/2014 | Huang et al. |
| 9,068,135 | B1 | 6/2015 | Yang et al. |
| 2006/0223717 | A1 * | 10/2006 | Nelson ............ C10M 133/56 508/189 |
| 2008/0085847 | A1 * | 4/2008 | Tse ............ C10M 143/00 508/591 |
| 2008/0128184 | A1 | 6/2008 | Loper et al. |

* cited by examiner

FOREIGN PATENT DOCUMENTS

EP    0355895 B1    12/1994

OTHER PUBLICATIONS

W.W. Yau, J.J. Kirkland, D.D. Bly, (Modern Size-Exclusion Liquid Chromatography, E. L duPont de Nemours & Co., pp. 4-12, John Wiley & Sons, New York, New York.

*Primary Examiner* — Taiwo Oladapo

(57) ABSTRACT

A lubricant additive concentrate having a kinematic viscosity of from about 40 to about 300 cSt at 100° C., containing a dispersant-detergent colloid complex, including a polybutenyl succinimide dispersant that is the reaction product of a polyamine and polybutenyl succinic anhydride (PIBSA) derived from polybutene having a number average molecular weight ($M_n$) of from about 1300 to about 2500 and a terminal vinylidene content of at least about 65%, and succinic and/or maleic anhydride via an ene maleation process, the PIBSA having a succinic anhydride (SA) functionality (F) of greater than 1.7 and less than about 2.5; and a detergent colloid including overbased detergent having a total base number (TBN) of from about 370 to about 1000 mg KOH/g derived from one or more surfactants selected from (i) sulfonate; (ii) phenate; and (iii) carboxylate surfactant; in which the mass ratio of the dispersant to the overbased detergent colloid in the concentrate is from about 0.5 to about 5.0; and the dispersant and overbased colloidal together constitute at least 28 mass %, of the concentrate.

10 Claims, No Drawings

DISPERSANT ADDITIVES AND ADDITIVE CONCENTRATES AND LUBRICATING OIL COMPOSITIONS CONTAINING SAME

The present invention relates to improved dispersants for lubricating oil compositions and lubricating oil additive concentrates that contain such dispersants. More particularly, the present invention directed to improved dispersants that provide excellent control of sludge/varnish formation piston cleanliness, ring-sticking performance and sooted oil rheology control, together with reduced interaction with overbased detergents colloids, such that stable lubricating oil concentrates of acceptable kinematic viscosity containing both the dispersant and overbased detergent colloid can be provided.

BACKGROUND OF THE INVENTION

Additives have been commonly used to try to improve the performance of lubricating oils for gasoline and diesel engines. Additives, or additive packages, may be used for a number of purposes, such as to improve detergency, reduce engine wear, stabilize lubricating oils against heat and oxidation, reduce oil consumption, inhibit corrosion and reduce friction loss. "Dispersants" are used to maintain insoluble materials formed by oxidation and other mechanisms during the use of the oil within the oil, to prevent sludge flocculation and the precipitation of these insoluble materials. Other functions of the dispersant include the prevention of soot particle agglomeration, providing sooted oil rheology control, and the prevention of deposit formation on the engine pistons.

Substantially all dispersants in use today are reaction products of (1) a polyalkenyl-substituted mono- or dicarboxylic acid, anhydride or ester (e.g., polyisobutenyl succinic anhydride or "PIBSA"), also commonly referred to as a carboxylic acid acylating agent; and (2) a nucleophilic reactant (e.g., an amine, alcohol, amino alcohol or polyol). More specifically, substantially all dispersants used commercially are succinimide dispersants; the reaction product of polyisobutenyl succinic anhydride and an amine, particularly a polyamine.

One approach to enhanced dispersant performance has been to increase the average number of polar head groups on the hydrophobic polymer chains of the dispersant. This enables more interaction with incipient sludge and deposit precursors or soot particles. Such enhanced interaction can be expected to result in improved performance provided that the hydrophobic polymer chain is large enough to maintain solubility in the oil while carrying the increased polar load. A method of increasing the average number of polar head groups per hydrophobic polymer chain involves increasing the succination ratio, or functionality (F) of succinimide dispersants. Such a method is described in U.S. Pat. No. 4,232,435, which discloses the use of the chlorine-assisted maleation process to yield high functionality dispersants with significant chain extension. Chain extension occurs when the polyfunctional succinic groups condense with polyfunctional amine groups to significantly increase the size of the dispersant). These chain-extended dispersants provided elevated thickening efficiency. However, the large size of the chain-extended dispersants actually caused deposit control to deteriorate, rather than improve and also caused interactions with other polar additives, specifically detergent colloids, to increase dramatically. Blending these dispersants with overbased detergents often resulted in gelation, requiring special blending procedures to prepare additive concentrates. Hence, succinimide dispersants with moderate functionality levels have been considered more desirable for both performance reasons (improved deposit control) and for making additive concentrates in combination with overbased detergents (see U.S. Pat. Nos. 6,743, 757; 6,734,148; and 6,127,321).

The polyalkenyl-substituted mono- or dicarboxylic acid, anhydride or ester from which succinimide dispersants are derived can be prepared using either a halogen (e.g., chlorine) assisted alkylation process, and those prepared using a halogen-free thermal, or "ene" reaction process. When using "conventional" Lewis acid catalyzed polyalkenes, high functionality carboxylic acid acylating agents, particularly polyisobutylene succinic anhydride ("PIBSA") cannot be provided via the halogen-free thermal reaction process. However, PIBSA having a higher functionality (e.g., a functionality of greater than 1.3) may be prepared via the thermal process using a polyalkene (particularly polyisobutylene) having a high terminal vinylidene content (greater than 65%, such as greater than 70%, 80% or 85%). Processes for producing high terminal vinylidene content polyisobutylene products (referred to as highly reactive polyisobutylene or "HR-PIB") are described, for example, in U.S. Pat. No. 4,152,499, and HR-PIB products are commercially available from TPC, or from BASF under the trade name Glissopal™. PIBSA having a functionality of greater than 1.3 prepared via the thermal process using polyisobutylene having a high terminal vinylidene content are described, together with succinimide dispersants derived therefrom, are described in EP 0 355 895. Moderate functionality dispersants derived from PIBSA produced via the thermal process using HR-PIB ("thermal dispersant") were shown to provide improved piston cleanliness performance compared to corresponding dispersants derived from PIBSA prepared using the chlorine assisted alkylation process ("chloro dispersant") in U.S. Pat. No. 6,743,757. The use of a mixture of a relatively high molecular weight chloro dispersant and 20 to 40 by mass, based on the total mass of dispersant, of a relatively low molecular weight thermal dispersant is described in U.S. Pat. No. 7,615,521 as reducing the increase in viscosity of an additive package containing an overbased sulfonate detergent during storage compared to when the high molecular weight chloro dispersant is used as the sole dispersant.

The present invention is directed to additive concentrates containing very high functionality dispersants that do not cause high levels of viscosity increase when blended with overbased detergent colloids yielding additive concentrates that remain fluid, and provide improved piston deposit control performance. While not wishing to be bound by any specific theory, it is believed that high functionality dispersants compatible with overbased detergent colloids can be provided by clustering the succinic functional groups at the terminal end of the polymer chain of the dispersant while simultaneously minimizing the extent of "remote" functionalization, wherein some succinic functional groups are placed at a distance from the terminal end of the polymer chain. A remote architecture appears to increase the size of the dispersant and the occurrence of bridging between two overbased detergent colloid particles in a concentrate, which results in gelation or very high concentrate viscosities. In contrast, the clustered architecture allows for an increased number of polar head groups per polymer chain, while simultaneously constraining viscosity growth due to chain extension to a modest level, resulting in improved deposit inhibition and enabling blending of fluid additive concentrates containing both the dispersant and overbased colloidal detergents. This clustered architecture can be produced with a polymer having a high terminal vinylidene content using an ene or thermal maleation process, rather than a chlorine-assisted maleation process, to incorporate the succinic functionality.

SUMMARY OF THE INVENTION

In accordance with a first aspect of the invention, there is provided a lubricant additive concentrate having a kinematic viscosity of from about 40 to about 300 cSt at 100° C., comprising dispersant-detergent colloid complex, wherein the dispersant comprises a polybutenyl succinimide reaction product of a polyamine having, or having on average, 4 to 8 nitrogen atoms per molecule, and polybutenyl succinic anhydride (PIBSA) derived from polybutene having a number average molecular weight ($M_n$) of from about 1300 to about 2500 daltons and a terminal vinylidene content of at least about 65%, and maleic anhydride via an ene maleation process, said PIBSA having a succinic anhydride (SA) functionality (F) of greater than 1.7 and less than about 2.5; and said detergent colloid comprises overbased detergent having a total base number (TBN) of from about 370 to about 1000 mg KOH/g (where the TBN is calculated on an active ingredient (A.I.) basis) derived from one or more surfactants selected from (i) sulfonate; (ii) phenate; and (iii) carboxylate surfactant(s); wherein the mass ratio of dispersant to detergent colloid in the concentrate is from about 0.5 to about 5.0; and dispersant and detergent colloid together constitutes at least 28 mass %, of the concentrate, on an A.I. basis.

In a second aspect of the invention, there is provided a lubricant additive concentrate as in the first aspect, wherein the polybutenyl succinimide reaction product has a coupling ratio of from about 0.7 to about 1.2.

In a third aspect of the invention, there is provided a lubricant additive concentrate as in the first or second aspect, wherein the thickening efficiency (TE) of the polybutenyl succinimide reaction product is less than about 0.07.

In a fourth aspect of the invention, there is provided a lubricant additive concentrate as in the first, second or third aspect, wherein the dispersant-detergent colloid complex has a modified thickening efficiency ($TE_m$) of less than about 4.

In a fifth aspect of the invention, there is provided a polybutenyl succinimide reaction product of a polyamine having, or having on average, 4 to 8 nitrogen atoms per molecule and polybutenyl succinic anhydride (PIBSA) derived from polybutene having a number average molecular weight ($M_n$) of from about 1300 to about 2500 and a terminal vinylidene content of at least about 65%, and succinic and/or maleic anhydride via an ene maleation process, having a succinic anhydride (SA) functionality (F) of greater than 1.7 and less than about 2.5.

In a sixth aspect of the invention, there is provided a polybutenyl succinimide reaction product, as in the fifth aspect, having a coupling ratio of from about 0.7 to about 1.2.

In a seventh aspect of the invention, there is provided a polybutenyl succinimide reaction product as in the fourth or fifth aspect, having a thickening efficiency (TE) of less than about 0.07.

Other and further objectives, advantages and features of the present invention will be understood by reference to the following specification.

DETAILED DESCRIPTION OF THE INVENTION

Dispersants useful in the context of the present invention are polybutenyl succinimide dispersants that are the reaction product of a polyamine having, or having on average, 4 to 8 nitrogen atoms per molecule and polybutenyl succinic anhydride (PIBSA) derived from polybutene having a number average molecular weight ($M_n$) of greater than about 1300, 1400, 1500, and preferably greater than 1800, and less than about 2500 such as less than about 2400, and having a succinic anhydride (SA) functionality (F) of greater than 1.7 and less than about 2.5, such as greater than 1.7 and less than about 2.2, preferably from about 1.8 to about 2.5, such as from about 1.8 or about 1.9 to about 2.3 or about 2.2. The polybutenyl succinic anhydride (PIBSA) is preferably derived from polybutene having a terminal vinylidene content of at least about 65%, 70%, or 80%, preferably at least about 85%, and succinic and/or maleic anhydride via an ene or thermal maleation process.

Functionality (F) can be determined according to the following formula:

$$F=(SAP \times M_n)/((1122 \times A.I.)-(SAP \times MW)) \quad (1)$$

wherein SAP is the saponification number (i.e., the number of milligrams of KOH consumed in the complete neutralization of the acid groups in one gram of the succinic-containing reaction product, as determined according to ASTM D94); $M_n$ is the number average molecular weight of the starting olefin polymer (polybutene); A.I. is the percent active ingredient of the succinic-containing reaction product (the remainder being unreacted polybutene and diluent); and MW is the molecular weight of the dicarboxylic acid-producing moiety (98 for maleic anhydride). Generally, each dicarboxylic acid-producing moiety (succinic group) will react with a nucleophilic group (polyamine moiety) and the number of succinic groups in the PIBSA will determine the number of nucleophilic groups in the finished dispersant.

Polymer molecular weight, specifically $M_n$, can be determined by various known techniques. One convenient method is gel permeation chromatography (GPC), which additionally provides molecular weight distribution information (see W. W. Yau, J. J. Kirkland and D. D. Bly, "Modern Size Exclusion Liquid Chromatography", John Wiley and Sons, New York, 1979). Another useful method for determining molecular weight, particularly for lower molecular weight polymers, is vapor pressure osmometry (see, e.g., ASTM D3592).

Suitable hydrocarbons or polymers employed in the formation of the dispersants of the present invention include polymers prepared by cationic polymerization of isobutene. Common polymers from this class include polyisobutenes obtained by polymerization of a $C_4$ refinery stream having a butene content of about 35 to about 75% by wt., and an isobutene content of about 30 to about 60% by wt., in the presence of a Lewis acid catalyst, such boron trifluoride ($BF_3$). Preferably, the polyisobutylene is prepared from a pure isobutylene stream or a Raffinate I stream to prepare reactive isobutylene polymers with terminal vinylidene olefins. Preferably, these polymers, referred to as highly reactive polyisobutylene (HR-PIB), have a terminal vinylidene content of at least 65%, e.g., 70%, more preferably at least 80%, most preferably, at least 85%. The preparation of such polymers is described, for example, in U.S. Pat. No. 4,152,499. HR-PIB is known and HR-PIB is commercially available from TPC, or from BASF under the trade names Glissopal™. Processes for thermally reacting HR-PIB with unsaturated carboxylic acids or anhydrides, and for further reacting the resulting acylating agents (PIBSA) with amines are well known and described, for example, in U.S. Pat. No. 4,152,499 and EP 0 355 895. Preferably, the HR-PIB used to produce the dispersant of the present invention will have a narrow molecular weight distribution (MWD), also referred to as polydispersity as determined by the ratio of weight average molecular weight ($M_w$) to number average molecular weight ($M_n$). Specifically, the HR-PIB from which the dispersants of the present invention are derived have a $M_w/M_n$ of about 1.2 to about 3.0, such as from about 1.5 to about 2.5, more preferably from about 1.6 to about 2.2.

To provide the required functionality, the monounsaturated carboxylic reactant, (maleic anhydride), typically will be used in an amount ranging from about 10 to about 300 mol. % excess, preferably from about 30 to 200 mol. % excess, such as 50 to 100 mol. % excess, based on the moles of polymer. Unreacted excess monounsaturated carboxylic reactant can be removed from the final dispersant product by, for example, stripping, usually under vacuum, if required.

Amines useful in the formation of the dispersants of the present invention include polyamines having, or having on average, 4 to 8 nitrogen atoms per molecule, preferably from about 6 to about 8 nitrogen atoms per molecule. These amines may be hydrocarbyl amines or may be predominantly hydrocarbyl amines in which the hydrocarbyl group includes other groups, e.g., hydroxy groups, alkoxy groups, amide groups, nitriles, imidazoline groups, and the like. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,2-propylene)triamine. Such polyamine mixtures, known as PAM, are commercially available. Useful polyamine mixtures also include mixtures derived by distilling the light ends from PAM products. The resulting mixtures, known as "heavy" PAM, or HPAM, are also commercially available. The properties and attributes of both PAM and/or HPAM are described, for example, in U.S. Pat. Nos. 4,938,881; 4,927,551; 5,230,714; 5,241,003; 5,565,128; 5,756,431; 5,792,730; and 5,854,186.

Preferably, the dispersants of the present invention have a coupling ratio of no greater than 1.3, such as from about 0.7 to about 1.3, preferably from about 0.8 to about 1.12, most preferably from about 0.9 to about 1.1. In the context of this disclosure, "coupling ratio" may be defined as a ratio of succinyl groups in the PIBSA to primary amine groups in the polyamine reactant. Dispersant(s) useful in the practice of the present invention are preferably bis-succinimides.

Preferably, the dispersants of the present invention have a thickening efficiency (TE, as defined infra) of less than about 0.07, such as less than about 0.06.

Lubricant additive concentrates of the present invention may contain polymeric dispersant additives other than the high molecular weight, high functionality dispersant of the present invention, however, the dispersant of the present invention preferably constitutes at least 61 mass %, such as at least 70 mass %, more preferably at least 80 mass %, such as at least 85 or 90 or 95 mass % of the total mass of dispersant in the concentrate. Such "other polymeric dispersant additives" can include polybutenyl succinimide reaction products of a polyamine having, or having on average, 4 to 8 nitrogen atoms per molecule and polybutenyl succinic anhydride (PIBSA), which is derived from polybutene having a number average molecular weight ($M_n$) of less than 1300 and a terminal vinylidene content of at least about 65%, and maleic anhydride via an ene maleation process and/or having a succinic anhydride (SA) functionality (F) of less than 1.7, as well as succinimide dispersants prepared using a halogen (e.g., chlorine) assisted alkylation process. The "other polymeric dispersant additives" may also include dispersants derived from polymers other than polybutene, such as polypropylene polymers, ethylene-propylene copolymers, ethylene-butene copolymers and copolymers of butene and maleic anhydride.

Either or both of the high molecular weight, high functionality dispersant of the present invention and the "other polymeric dispersant additives" may be post treated by a variety of conventional post treatments such as boration, as generally taught in U.S. Pat. Nos. 3,087,936 and 3,254,025. Boration of the dispersant is readily accomplished by treating an acyl nitrogen-containing dispersant with a boron compound such as boron oxide, boron halide boron acids, and esters of boron acids, in an amount sufficient to provide from about 0.1 to about 20 atomic proportions of boron for each mole of acylated nitrogen composition. Useful dispersants contain from about 0.05 to about 2.0 mass %, e.g., from about 0.05 to about 0.7 mass % boron. The boron, which appears in the product as dehydrated boric acid polymers (primarily $(HBO_2)_3$), is believed to attach to the dispersant imides and diimides as amine salts, e.g., the metaborate salt of the diimide. Boration can be carried out by adding from about 0.5 to 4 mass %, e.g., from about 1 to about 3 mass % (based on the mass of acyl nitrogen compound) of a boron compound, preferably boric acid, usually as a slurry, to the acyl nitrogen compound and heating with stirring at from about 135° C. to about 190° C., e.g., 140° C. to 170° C., for from about 1 to about 5 hours, followed by nitrogen stripping. Alternatively, the boron treatment can be conducted by adding boric acid to a hot reaction mixture of the dicarboxylic acid material and amine, while removing water. Other post reaction processes commonly known in the art can also be applied. Preferably, the high molecular weight, high functionality dispersant of the present invention is not borated.

Either or both of the high molecular weight, high functionality dispersant of the present invention and the "other polymeric dispersant additives" may also be post treated by reaction with a "capping agent". Conventionally, nitrogen-containing dispersants have been "capped" to reduce the adverse effect such dispersants have on the fluoroelastomer engine seals. Numerous capping agents and methods are known. Of the known "capping agents", those that convert basic dispersant amino groups to non-basic moieties (e.g., amido or imido groups) are most suitable. The reaction of a nitrogen-containing dispersant and alkyl acetoacetate (e.g., ethyl acetoacetate (EAA)) is described, for example, in U.S. Pat. Nos. 4,839,071; 4,839,072 and 4,579,675. The reaction of a nitrogen-containing dispersant and formic acid is described, for example, in U.S. Pat. No. 3,185,704. The reaction product of a nitrogen-containing dispersant and other suitable capping agents are described in U.S. Pat. No. 4,663,064 (glycolic acid); U.S. Pat. Nos. 4,612,132; 5,334,321; 5,356,552; 5,716,912; 5,849,676; 5,861,363 (alkyl and alkylene carbonates, e.g., ethylene carbonate); U.S. Pat. No. 5,328,622 (mono-epoxide); U.S. Pat. Nos. 5,026,495; 5,085,788; 5,259,906; 5,407,591 (poly (e.g., bis)-epoxides) and U.S. Pat. No. 4,686,054 (maleic anhydride or succinic anhydride). The foregoing list is not exhaustive; other methods of capping dispersants are known to those skilled in the art. Preferably, the high molecular weight, high functionality dispersant of the present invention is not post treated by reaction with a capping agent.

Metal-containing or ash-forming detergents function as both detergents to reduce or remove deposits and as acid neutralizers or rust inhibitors, thereby reducing wear and corrosion and extending engine life. Detergents generally comprise a polar head with a long hydrophobic tail. The polar head comprises a metal salt of an acidic organic compound. The salts may contain a substantially stoichiometric amount of the metal in which case they are usually described as normal or neutral salts. A large amount of a metal base may be incorporated by reacting excess metal compound (e.g., an oxide or hydroxide) with an acidic gas (e.g., carbon dioxide). The resulting overbased detergent comprises neutralized detergent as the outer layer of a metal base (e.g. hydroxide or carbonate) micelle.

Detergents are conventionally provided in a diluent such that only about 50 mass % to about 55 mass % of the detergent composition constitutes active ingredient (A.I.). The stated TBN of commercial detergents is actually the TBN of the detergent composition; the detergent diluted in diluent oil. Normal or neutral detergents in diluted form typically have a total base number or TBN (as can be measured by ASTM D2896) of from 0 to 80 mg KOH/g. Overbased detergents in diluted form may have a TBN of 150 mg KOH/g or greater, and typically will have a TBN of from 250 to 500 mg KOH/g or more The additive concentrates of the present invention include detergent colloids comprising one or more overbased detergents having, on an A.I. basis, a TBN of from about 370 to about 1000 mg KOH/g, that are derived from one or more surfactants selected from (i) sulfonate; (ii) phenate; and (iii) carboxylate (e.g., salicylate) and a metal, particularly an alkali or alkaline earth metal, e.g., sodium, potassium, lithium, calcium, and magnesium. The TBN of the detergents calculated on an A.I. basis correspond to the TBN of a conventional detergent composition in which the active detergent is in diluted form, of from about 200 to about 500 mg KOH/g.

Sulfonate detergents may be prepared from sulfonic acids which are typically obtained by the sulfonation of alkyl substituted aromatic hydrocarbons such as those obtained from the fractionation of petroleum or by the alkylation of aromatic hydrocarbons. Examples included those obtained by alkylating benzene, toluene, xylene, naphthalene, diphenyl or their halogen derivatives such as chlorobenzene, chlorotoluene and chloronaphthalene. The alkylation may be carried out in the presence of a catalyst with alkylating agents having from about 3 to more than 70 carbon atoms. The alkaryl sulfonates usually contain from about 9 to about 80 or more carbon atoms, preferably from about 16 to about 60 carbon atoms per alkyl substituted aromatic moiety.

The oil soluble alkyl or alkaryl sulfonic acids may be neutralized with oxides, hydroxides, alkoxides, carbonates, carboxylate, sulfides, hydrosulfides, nitrates, borates and ethers of the metal. The amount of metal compound is chosen having regard to the desired TBN of the final product but typically ranges from about 100 to 220 wt. % (preferably at least 125 wt. %) of that stoichiometrically required.

Phenate detergents, metal salts of phenols and sulfurized phenols, are prepared by reaction with an appropriate metal compound such as an oxide or hydroxide and neutral or overbased products may be obtained by methods well known in the art. Sulfurized phenols may be prepared by reacting a phenol with sulfur or a sulfur containing compound such as hydrogen sulfide, sulfur monohalide or sulfur dihalide, to form products which are generally mixtures of compounds in which 2 or more phenols are bridged by sulfur containing bridges. The term "phenate", as used herein with reference to surfactant type, is also intended to include alkyl-bridged phenol condensates, as described, for example, in U.S. Pat. No. 5,616,816; as well as bridged phenol condensates substituted with —CHO or $CH_2OH_2$ groups, sometimes referred to as "saligenin", as described, for example, in U.S. Pat. No. 7,462,583.

Carboxylate detergents, e.g., salicylates, can be prepared by reacting an aromatic carboxylic acid with an appropriate metal compound, such as an oxide or hydroxide, and neutral or overbased products may be obtained by methods well known in the art. The aromatic moiety of the aromatic carboxylic acid can contain heteroatoms, such as nitrogen and oxygen. Preferably, the moiety contains only carbon atoms; more preferably the moiety contains six or more carbon atoms; for example benzene is a preferred moiety. The aromatic carboxylic acid may contain one or more aromatic moieties, such as one or more benzene rings, either fused or connected via alkylene bridges. The carboxylic moiety may be attached directly or indirectly to the aromatic moiety. Preferably the carboxylic acid group is attached directly to a carbon atom on the aromatic moiety, such as a carbon atom on the benzene ring. More preferably, the aromatic moiety also contains a second functional group, such as a hydroxy group or a sulfonate group, which can be attached directly or indirectly to a carbon atom on the aromatic moiety.

Preferred examples of aromatic carboxylic acids are salicylic acids and sulfurized derivatives thereof, such as hydrocarbyl substituted salicylic acid and derivatives thereof. Processes for sulfurizing, for example a hydrocarbyl-substituted salicylic acid, are known to those skilled in the art. Salicylic acids are typically prepared by carboxylation, for example, by the Kolbe-Schmitt process, of phenoxides, and in that case, will generally be obtained, normally in a diluent, in admixture with uncarboxylated phenol.

Preferred substituents in oil soluble salicylic acids are alkyl substituents. In alkyl-substituted salicylic acids, the alkyl groups advantageously contain 5 to 100, preferably 9 to 30, especially 14 to 20, carbon atoms. Where there is more than one alkyl group, the average number of carbon atoms in all of the alkyl groups is preferably at least 9 to ensure adequate oil solubility. The term "carboxylate", as used herein with reference to surfactant type, is also intended to include phenates that have been modified by carboxylic acids, such as stearic acid, as described, for example, in U.S. Pat. Nos. 5,714,443; 5,716,914; 6,090,759; and 6,090,760, so-called "phenolates", as described, for example, in U.S. Pat. Nos. 5,808,145; and 6,001,785, and optionally substituted bridged phenol/salicylate condensates, sometimes referred to as "salixarate", which is described, for example, in U.S. Pat. No. 6,200,936.

Overbased detergents that that may be present in the concentrates of the present invention also include "hybrid" detergents formed with mixed surfactant systems, e.g., phenate/salicylates, sulfonate/phenates, sulfonate/salicylates, and sulfonates/phenates/salicylates, as described, for example, in pending U.S. Pat. Nos. 6,153,565; 6,281,179; 6,429,178; and 6,429,179.

Lubricant additive concentrates of the present invention may contain neutral detergents and overbased detergents not of the present invention, as well as overbased detergents of the present invention, however, overbased detergents of the present invention will constitute at least 70 mass %, such as at least 80 mass %, preferably at least 85 mass %, such as at least 90 or 95 mass % of the total mass of colloidal detergent in the concentrate.

Oils of lubricating viscosity that may be used as the diluent in the additive concentrates of the present invention may be selected from natural lubricating oils, synthetic lubricating oils and mixtures thereof. Generally, the viscosity of these oils ranges from about 2 mm$^2$/sec (centistokes) to about 40 mm$^2$/sec, especially from about 4 mm$^2$/sec to about 20 mm$^2$/sec, as measured at 100° C.

Natural oils include animal oils and vegetable oils (e.g., castor oil, lard oil); liquid petroleum oils and hydrorefined, solvent-treated or acid-treated mineral oils of the paraffinic, naphthenic and mixed paraffinic-naphthenic types. Oils of lubricating viscosity derived from coal or shale also serve as useful base oils.

Other examples of suitable diluent oils are gas-to-liquid ("GTL") oils, i.e. the diluent oil may be an oil derived from Fischer-Tropsch synthesized hydrocarbons made from synthesis gas containing H$_2$ and CO using a Fischer-Tropsch catalyst. These hydrocarbons typically require further processing in order to be useful as diluent oil. For example, they may, by methods known in the art, be hydroisomerized; hydrocracked and hydroisomerized; dewaxed; or hydroisomerized and dewaxed.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, and the alkyl and aryl ethers of polyoxyalkylene polymers (e.g., methyl-polyiso-propylene glycol ether having a molecular weight of 1000 or diphenyl ether of poly-ethylene glycol having a molecular weight of 1000 to 1500); and mono- and polycarboxylic esters thereof, for example, the acetic acid esters, mixed C$_3$-C$_8$ fatty acid esters and C$_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of such esters includes dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from C$_5$ to C$_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils comprise another useful class of synthetic lubricants; such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl)siloxanes. Other synthetic lubricating oils include liquid esters of phosphorous-containing acids (e.g., tricresyl phosphate, trioctyl phosphate, diethyl ester of decylphosphonic acid) and polymeric tetrahydrofurans.

The diluent oil may comprise a Group I, Group II, Group III, Group IV or Group V base stocks or blends of the aforementioned base stocks. Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998.

Additional additives may be incorporated into the compositions of the invention to enable particular performance requirements to be met. Examples of additives which may be included in the lubricating oil compositions of the present invention are metal rust inhibitors, viscosity index improvers, corrosion inhibitors, oxidation inhibitors, friction modifiers, anti-foaming agents, anti-wear agents and pour point depressants. Some are discussed in further detail below.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dihydrocarbyl dithiophosphoric acid (DDPA), usually by reaction of one or more alcohol or a phenol with P$_2$S$_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt, any basic or neutral zinc compound could be used but the oxides, hydroxides and carbonates are most generally employed. Commercial additives frequently contain an excess of zinc due to the use of an excess of the basic zinc compound in the neutralization reaction.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, aromatic amines having at least two aromatic groups attached directly to the nitrogen (e.g., di-phenyl amines), alkaline earth metal salts of alkylphenolthioesters having preferably C$_5$ to C$_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine. A preferred lubricating oil composition contains a dispersant composition of the present invention, base oil, and a nitrogen-containing friction modifier.

Other known friction modifiers comprise oil-soluble organo-molybdenum compounds. Such organo-molybdenum friction modifiers also provide antioxidant and antiwear credits to a lubricating oil composition. As an example of such oil soluble organo-molybdenum compounds, there may be mentioned the dithiocarbamates, dithiophosphates, dithiophosphinates, xanthates, thioxanthates, sulfides, and the like, and mixtures thereof. Particularly preferred are molybdenum dithiocarbamates, dialkyldithiophosphates, alkyl xanthates and alkylthioxanthates. Additionally, the molybdenum compound may be an acidic molybdenum compound. These compounds will react with a basic nitrogen compound as measured by ASTM test D-664 or D-2896 titration procedure and are typically hexavalent. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds.

Representative examples of suitable viscosity modifiers are polyisobutylene, copolymers of ethylene and propylene, polymethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

A dispersant-viscosity index improver functions both as a viscosity index improver and as a dispersant. Examples of viscosity index improver dispersants include reaction products of amines, for example aromatic amines, with a hydrocarbyl-substituted mono- or dicarboxylic acid in which the hydrocarbyl substituent comprises a chain of sufficient length to impart viscosity index improving properties to the compounds. In general, the viscosity index improver dispersant may be, for example, a polymer of a $C_3$ to $C_{10}$ unsaturated mono-carboxylic acid or a $C_4$ to $C_{10}$ di-carboxylic acid with an unsaturated nitrogen-containing monomer having 4 to 20 carbon atoms; a polymer of a $C_2$ to $C_{20}$ olefin with an unsaturated $C_3$ to $C_{10}$ mono- or di-carboxylic acid neutralised with an amine, hydroxyamine or an alcohol; or a polymer of ethylene with a $C_3$ to $C_{20}$ olefin further reacted either by grafting a $C_4$ to $C_{20}$ unsaturated nitrogen-containing monomer thereon or by grafting an unsaturated acid onto the polymer backbone and then reacting carboxylic acid groups of the grafted acid with amine, hydroxyl amine or alcohol.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates. Foam control can be provided by an antifoamant of the polysiloxane type, for example, silicone oil or polydimethyl siloxane.

In the present invention it may be necessary to include an additive which maintains the stability of the viscosity of the blend. Thus, although polar group-containing additives achieve a suitably low viscosity in the pre-blending stage it has been observed that some compositions increase in viscosity when stored for prolonged periods. Additives which are effective in controlling this viscosity increase include the long chain hydrocarbons functionalized by reaction with mono- or dicarboxylic acids or anhydrides which are used in the preparation of the ashless dispersants as disclosed supra.

In lubricant additive concentrates of the present invention, the mass ratio of dispersant to detergent colloid is preferably from about 0.5 to about 5.0, such as from about 1.0 to about 4.0 or from about 1.5 to about 3.0. Preferably, dispersant and overbased colloid together constitutes at least 28 mass %, such as at least 29 mass % or 30 mass % of the concentrate, on an A.I. basis. The total additive content of the lubricant additive concentrates of the present invention can be from about 30 mass % to about 70 mass %, such as from about 35 mass % to about 50 mass %, based on the total mass of the concentrate.

In the lubricant additive concentrates of the present invention, the dispersant-detergent colloid complex preferably has a modified thickening efficiency ($TE_m$, as defined infra) of less than about 4, such as less than about 3. To insure acceptable handling ability, the lubricant additive concentrates of the present invention preferably have a kinematic viscosity at 100° C. ($kv_{100}$) of less than about 300 cSt, such as less than about 250 cSt or less than about 200 cSt.

This invention will be further understood by reference to the following examples, wherein all parts are parts by weight, unless otherwise noted and which include preferred embodiments of the invention.

EXAMPLES

Dispersant chain extension, as noted previously, refers to the increase in the size of the dispersant that results from the condensation of polyfunctional PIBSA units with polyfunctional amine units. Dispersant chain extension can be conveniently assessed by examining the thickening efficiency (TE) of the dispersant as a 1% active ingredient (AI) solution in SN100 base oil:

$$TE = \log vis/vis_0$$

wherein vis=the kinematic viscosity of the solution and $vis_0$=the viscosity of the SN100 base oil at 100° C.

Table 1 compares the TE of dispersants prepared from PIBSA made via the chloro-assisted process using conventional PIB with those prepared from PIBSA made via an ene process using HR-PIB at various PIB molecular weights and succinic functionality levels. The same polyamine and stoichiometry was used in the preparation of all the samples.

TABLE 1

| Ex. | Maleation Process | PIB Mol. Wt. | Functionality | TE |
| --- | --- | --- | --- | --- |
| 1 | Chloro-assisted | 2225 | 1.4 | 0.057 |
| 2 | Chloro-assisted | 2225 | 1.7 | 0.072 |
| 3 | Chloro-assisted | 1300 | 1.7 | 0.071 |
| 4 | Ene | 2300 | 1.4 | 0.056 |
| 5 | Ene | 2300 | 1.9 | 0.047 |
| 6 | Ene | 1300 | 1.9 | 0.047 |

As shown, with dispersants prepared from PIBSA made via the chloro-assisted process using conventional PIB, increasing functionality resulted in increased viscosity from chain extension. Surprisingly, however, with dispersants prepared from PIBSA made via an ene process using HR-PIB, increasing functionality was actually found to reduce the viscosity.

The level of interaction between the dispersant and detergent colloid in a concentrate can be assessed conveniently by examining the modified thickening efficiency ($TE_m$) of the dispersant-detergent colloid complex formed in a highly concentrated medium:

$$TE_m = \log vis_{48}/vis_0$$

wherein $vis_{48}$=kinematic viscosity of a 48% AI dispersant-detergent complex in SN100 base oil at 100° C., and $vis_0$=kinematic viscosity of SN100 base oil at 100° C. The 48% AI concentration is purposely selected to maximize potential interactions.

Table 2 compares the $TE_m$ values of dispersant-detergent complexes with varying dispersant structures and dispersant to detergent ratios using an overbased calcium sulfonate detergent having a TBN of 300 mg KOH/g.

TABLE 2

| Ex. | Maleation Process | PIB Mol. Wt. | PIBSA Funct. | TE$_m$ for Disp./Det. Blend Ratios at 48% AI of Disp/Det. Complex | | |
|---|---|---|---|---|---|---|
| | | | | Disp:Det = 0.57 | Disp:Det = 0.91 | Disp:Det = 1.53 |
| 7 | Chloro | 2225 | 1.4 | gel | 2.39 | 2.12 |
| 8 | Chloro | 2225 | 1.7 | gel | gel | gel |
| 9 | Chloro | 1300 | 1.7 | gel | gel | gel |
| 10 | Ene | 2300 | 1.4 | 1.84 | 1.77 | 1.74 |
| 11 | Ene | 2300 | 1.9 | 1.99 | 1.84 | 1.77 |
| 12 | Ene | 1300 | 1.9 | 2.25 | 1.95 | 1.81 |

The viscosity of a dispersant/detergent complex is dependent on the dispersant to detergent ratio. At moderate functionality levels (e.g., 1.4), concentrated complexes can be produced at most ratios using dispersants derived from PIBSA produced via either maleation process. As shown above, however, at high functionality levels, dispersants derived from PIBSA produced via an ene process using HR-PIB were found to interact with overbased detergents to a far lesser extent than dispersants prepared from PIBSA made via the chloro-assisted process using conventional PIB. Thus, fluid dispersant-detergent concentrates can be produced using dispersants having the very high levels of functionality required for improved lubricant performance.

The viscosity of the dispersant/detergent complex also affects the viscosity of the fully formulated concentrate or additive package. Table 3 shows how various dispersant/detergent complexes impact the viscosity of a formulated additive package. The compositions of the additive packages, which represent additive packages for the blending of a PCMO crankcase lubricant, are shown in Table 4, and are substantially identical for each of the examples shown in Table 3, except for the substitution of various dispersants and dispersant-detergent ratios, as noted.

TABLE 3

| Ex. | Maleation Process | PIB Mol. Wt. | PIBSA Funct. | Kv$_{100}$ for adpacks containing dispersant-detergent colloid | | |
|---|---|---|---|---|---|---|
| | | | | ADP A AI = 28%* Disp:Det. = 1.4 (w/w) | ADP B AI = 30.2%* Disp:Det. = 1.4 (w/w) | ADP C AI = 32.6%* Disp:Det. = 1.9 (w/w) |
| 13 | Chloro | 2225 | 1.4 | | 78.8 | 104.7 |
| 14 | Chloro | 2225 | 1.7 | 245 | | 403 (30% AI) |
| 15 | Chloro | 1300 | 1.7 | TVTM** | TVTM** | TVTM* |
| 16 | Ene | 2300 | 1.4 | | 65.1 | 88.4 |
| 17 | Ene | 2300 | 1.9 | | 66.9 | 90.8 |
| 18 | Ene | 1300 | 1.9 | | 99.2 | 146.2 |

*AI of dispersant-detergent colloid in the additive package
*Too viscous to measure

TABLE 4

| | ADP A | ADP B | ADP C |
|---|---|---|---|
| Disp./Det. (w/w) | 1.4 | 1.4 | 1.9 |
| Disp. + Det. AI (%) | 28 | 30.2 | 32.6 |
| | % Comp. | % Comp. | % Comp. |
| Dispersant | 16.5 | 17.7 | 21.2 |
| Overbased Calcium Sulfonate Det. (545 TBN, A.I.) | 11.5 | 12.5 | 11.4 |
| ZDDP | 14.2 | 15.2 | 13.7 |
| Molybdenum dithiocarbamate AO | 1.8 | 1.9 | 1.8 |
| Aminic Antioxidant | 10.7 | 11.4 | 10.3 |
| Diluent Oil | remainder | remainder | remainder |
| Package Treat Rate | 7.5 | 7.1 | 7.8 |

As shown in Table 3, at dispersant functionalities of 1.4, additive packages having various types of dispersant/detergent complexes all had comparable viscometric properties. When dispersant functionality was increased to 1.7, additive packages containing about 30% A.I. of the dispersant/detergent complex, containing dispersant derived via the chloro-assisted maleation process using conventional PIB exhibited viscosities well above the normal commercial limits of 300 cSt at 100° C. In contrast, additive packages containing about 30% A.I. of the dispersant/detergent complex, containing dispersant derived via the ene maleation process using HR PIB provided acceptable viscosities even with dispersants having a functionality of 1.9.

Piston deposit control performance of various dispersants in identical all sulfonate formulations, as measured using an industry standard Sequence IIIG test, is shown in Table 5. Weighted Piston Deposits is a merit rating wherein higher numbers indicate a cleaner piston.

TABLE 5

| Ex. | Maleation Process | PIB Mol. Wt. | Functionality | WPD*** |
|---|---|---|---|---|
| 19 | Chloro-assisted | 2225 | 1.4 | 3.4 |
| 20 | Chloro-assisted | 2225 | 1.7 | 2.9 |
| 21 | Chloro-assisted | 1300 | 1.4 | 3.2 |
| 22 | Chloro-assisted | 1300 | 1.7 | 2.9 |
| 23 | Ene | 2300 | 1.4 | 3.8 |

TABLE 5-continued

| Ex. | Maleation Process | PIB Mol. Wt. | Functionality | WPD*** |
|---|---|---|---|---|
| 24 | Ene | 2300 | 1.9 | 4.2 |
| 25 | Ene | 1300 | 1.4 | 3.6 |
| 26 | Ene | 1300 | 1.9 | 3.8 |

***Weighted Piston Deposits, Sequence IIIG

As shown, in Table 5, with dispersant derived via the chloro-assisted maleation process using conventional PIB, increasing dispersant functionality causes a significant reduction in piston deposit control performance, as measured by the Sequence IIIG test. In contrast, with dispersant derived via the ene maleation process using HR PIB, it is found that increasing dispersant functionality does not cause a decrease in piston deposit control performance, and actually provides an improvement, particularly with higher molecular weight dispersants.

It should be noted that the lubricant additive concentrates and lubricating oil compositions of this invention comprise defined, individual, i.e., separate, components that may or may not remain the same chemically before and after mixing. Thus, it will be understood that various components of the composition, essential as well as optional and customary, may react under the conditions of formulation, storage or use and that the invention also is directed to, and encompasses, the product obtainable, or obtained, as a result of any such reaction.

The disclosures of all patents, articles and other materials described herein are hereby incorporated, in their entirety, into this specification by reference. The principles, preferred embodiments and modes of operation of the present invention have been described in the foregoing specification. What applicants submit is their invention, however, is not to be construed as limited to the particular embodiments disclosed, since the disclosed embodiments are regarded as illustrative rather than limiting. Changes may be made by those skilled in the art without departing from the spirit of the invention.

What is claimed is:

1. A lubricant additive concentrate having a kinematic viscosity of from about 40 to about 300 cSt., as measured at 100° C., comprising a dispersant-detergent colloid complex in diluent oil, wherein said dispersant comprises a polybutenyl succinimide reaction product of a polyamine having, or having on average 4 to 8 nitrogen atoms per molecule and polybutenyl succinic anhydride (PIBSA) derived from polybutene having a number average molecular weight of from about 1300 to about 2500 daltons and a terminal vinylidene content of at least about 65%, and maleic and/or succinic anhydride, by an ene maleation process, and having a succinic anhydride (SA) functionality of greater than 1.7, and less than about 2.5; and said detergent colloid comprises overbased detergent having a total base number (TBN) of from about 370 to about 1000 mg KOH/g, derived from one or more surfactants selected from (i) sulfonate; (ii) phenate; and (iii) carboxylate surfactants; wherein the mass ratio of said dispersant to said detergent colloid in the concentrate is from about 1.4 to about 3.0; and said dispersant and detergent colloid together constitute at least 28 mass % to about 50 mass %, on an A.I. basis, of said concentrate.

2. The lubricant additive concentrate of claim 1, wherein said dispersant has a coupling ratio of from about 0.7 to about 1.3.

3. The lubricant additive concentrate of claim 2, wherein said dispersant has a coupling ratio of from about 0.9 to about 1.1.

4. The lubricant additive concentrate of claim 1, wherein said dispersant has a thickening efficiency (TE) of less than about 0.07.

5. The lubricant additive concentrate of claim 1, wherein said dispersant-detergent colloid complex has a modified thickening efficiency ($TE_m$) of less than about 4.

6. The lubricant additive concentrate of claim 1, further comprising at least one additional additive selected from the group consisting of zinc-phosphorus antiwear agents, molybdenum-containing antiwear agents, organic friction modifiers, antioxidants, dispersants other than said polybutenyl succinimide reaction product, viscosity modifiers, pour point depressants, surfactants and detergent additives other than said overbased detergent.

7. The lubricant additive concentrate of claim 1, wherein said polybutenyl succinimide reaction product constitutes at least 61 mass % of the total mass of dispersant in said concentrate.

8. The lubricant additive concentrate of claim 6, wherein said polybutenyl succinimide reaction product constitutes at least 61 mass % of the total mass of dispersant in said concentrate.

9. The lubricant additive concentrate of claim 1, wherein said overbased detergent constitutes at least 70 mass % of the total mass of detergent in said concentrate.

10. The lubricant additive concentrate of claim 6, wherein said overbased detergent constitutes at least 70 mass % of the total mass of detergent in said concentrate.

* * * * *